United States Patent

Severn

[15] 3,649,960
[45] Mar. 14, 1972

[54] WARNING CIRCUITS FOR ROAD VEHICLES

[72] Inventor: Arthur Charles Severn, Burnley, England

[73] Assignee: Joseph Lucas (Industries) Limited, Birmingham, England

[22] Filed: Apr. 29, 1970

[21] Appl. No.: 32,872

[30] Foreign Application Priority Data

June 9, 1969 Great Britain......................29,037/69

[52] U.S. Cl. .............................................340/52 D, 307/10
[51] Int. Cl. ...................................B60q 5/00, G08b 21/00
[58] Field of Search.....................340/52, 52 D, 53; 307/10

[56] References Cited

UNITED STATES PATENTS

| | | | |
|---|---|---|---|
| 3,325,783 | 6/1967 | Webb | 340/52 D |
| 2,799,843 | 7/1957 | Savino | 340/52 D |
| 3,072,884 | 1/1963 | Hughes | 340/52 D |
| 3,256,461 | 6/1966 | Foreman et al. | 340/52 D |

*Primary Examiner*—Alvin H. Waring
*Attorney*—Holman, Glascock, Downing & Seebold

[57] ABSTRACT

In a warning circuit for road vehicles for giving a warning to the driver if he attempts to leave the vehicle without first removing the ignition key, the vehicle battery is bridged by a series circuit including a first switch which is opened when the ignition key is removed, a warning device, and a second switch which is closed when the driver's door is opened. A second series circuit is connected across the battery includes a courtesy light and a third switch which when closed energizes the courtesy light. A diode couples the first and second series circuits and permits energization of the courtesy light by the second switch while preventing energization of the warning device by the third switch.

3 Claims, 2 Drawing Figures

PATENTED MAR 14 1972 3,649,960

INVENTOR
Arthur Charles Severn
Holman, Glascock, Downing / Seebold
ATTORNEYS

WARNING CIRCUITS FOR ROAD VEHICLES

This invention relates to warning circuits for road vehicles for giving a warning to a driver if he attempts to leave the vehicle without first removing the ignition key.

A warning circuit according to the invention comprises first and second terminals for connection to the vehicle battery, a first series circuit connected across said terminals and including a first switch which is opened when the ignition key is removed, a warning device and a second switch which is closed when the driver's door is opened, a second series circuit connected across said terminals and including a courtesy light and a third switch which when closed energizes the courtesy light, and a diode coupling the first and second series circuits and permitting energization of the courtesy light by the second switch while preventing energization of the warning device by the third switch.

Figure 1:
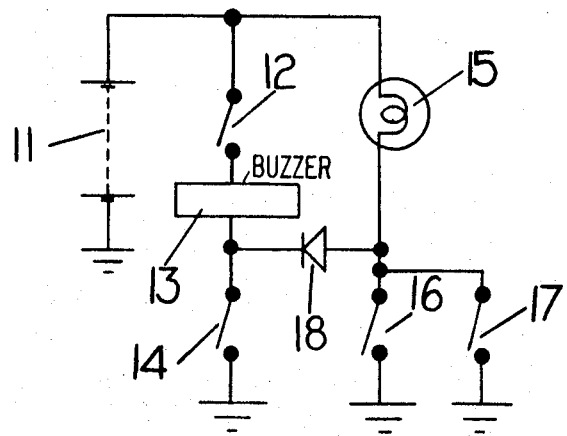
Figure 2:
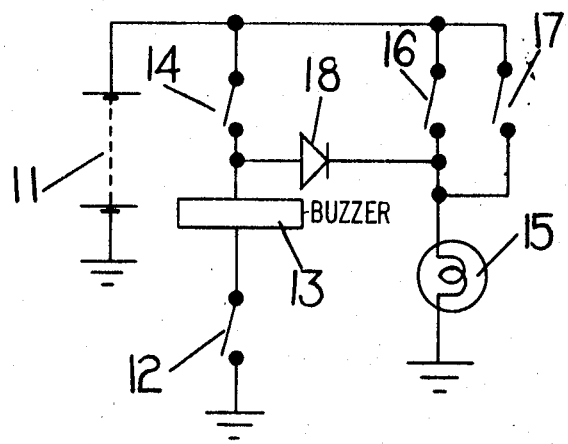

In the accompanying drawings FIGS. 1 and 2 are circuit diagrams illustrating two examples of the invention.

Referring to FIG. 1, the vehicle includes a battery 11 having its negative terminal earthed. Connected across the battery is a first series circuit including a switch 12, a buzzer 13 and a switch 14. The switch 12 is operated by the ignition key and is open when the ignition key is removed but closed when the ignition key is in position, and the switch 14 is operated by the driver's door and closes when the driver's door is opened. A second series circuit is also connected across the battery 11 and includes a courtesy light 15 and a switch 16 which is manually operable to energize the courtesy light 15. The switch 16 is bridged by a second switch 17 operated by the passenger door of the vehicle.

The junction of the buzzer 13 and switch 14 is connected to the cathode of a diode 18, and the anode of the diode is connected to the junction of the light 15 and switches 16 and 17.

When any one of the switches 14, 16 or 17 closes, then the light 15 is energized. Moreover, if the driver makes an attempt to leave the vehicle without first removing the ignition key, then when the switch 14 closes the buzzer 13 will be energized through the switch 12 to give the driver a warning. If the ignition key is removed, then the switch 12 opens so that the buzzer 13 is not energized.

The diode 18 prevents operation of the buzzer 13 when one of the switches 16 or 17 is closed with the ignition key still in position.

FIG. 2 works in exactly the same way as FIG. 1, but the parts are slightly rearranged in the two series circuits. In FIG. 1 the switches 14, 16 and 17 are all earth return and the switch 12 is an insulated return switch, but in FIG. 2 an earth return switch 12 and an earthed courtesy light 15 can be used, with the switches 14, 16 and 17 all being insulated return switches.

Having thus described my invention what I claim as new and desire to secure by Letters Patent is:-

1. A warning circuit for road vehicles for giving a warning to a driver if he attempts to leave the vehicle without first removing the ignition key, comprising first and second terminals for connection to the vehicle battery, a first series circuit connected across said terminals and including a first switch which is opened when the ignition key is removed, a warning device and a second switch which is closed when the driver's door is opened, a second series circuit connected across said terminals and including a courtesy light and a third switch which when closed energizes the courtesy light, and a diode coupling the first and second series circuits and permitting energization of the courtesy light by the second switch while preventing energization of the warning device by the third switch.

2. A circuit as claimed in claim 1 in which the third switch is manually operable.

3. A circuit as claimed in claim 1 in which the third switch is closed when a door other than the driver's door is opened.

* * * * *